3,117,069
PROCESS OF PREPARING TRANS-1,2-BIS (n-PROPYLSULFONYL) ETHYLENE
Edward R. Levy, Shawnee Mission, Kans., and Donovan N. Smith, Jr., Parkville, Mo., assignors to Chemagro Corporation, New York, N.Y., a corporation of New York
No Drawing. Filed Jan. 31, 1962, Ser. No. 170,229
1 Claim. (Cl. 204—158)

This invention relates to a process of making 1,2-bis (alkylthio) ethylenes.

The lower 1,2-bis (alkyl sulfonyl) ethylenes, and particularly trans 1,2-bis (n-propylsulfonyl) ethylene, have proven to be very effective fungicides. Unfortunately, however, these compounds have been quite expensive to make. The lower 1,2-bis (alkyl sulfonyl) ethylenes can be made quite readily from the 1,2-bis (alkylthio) ethylenes by oxidation. However, the 1,2-bis (alkylthio) ethylenes also are expensive to make.

It has previously been proposed to form cis 1,2-bis (p-tolylthio) ethylene by reacting sodium p-toluenethiolate with vinylidene chloride under pressure (e.g., in a Carius tube) at elevated temperature for a long period of time, e.g., over 65 hours. This reaction is shown in the Journal of American Chemical Society, volume 78, pages 2748-2751. Such a procedure has the disadvantages of requiring long periods of time as well as the use of expensive pressure equipment.

It is an object of the present invention to prepare 1,2-bis (lower alkylthio) ethylenes by an improved, simplified process.

Another object is to prepare cis 1,2-bis (n-propylthio) ethylene in a short period of time without the necessity of using pressure equipment.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting vinylidene chloride with an alkali metal lower alkylthiolate under alkaline conditions in the presence of an alcohol boiling above about 100° C. at atmospheric pressure and a temperature of from 100° C. to reflux.

As the alkali metal lower alkylthiolate there can be used sodium methylthiolate, sodium ethylthiolate, sodium n-propylthiolate, potassium n-propylthiolate, sodium isopropylthiolate, sodium n-butylthiolate, sodium n-amylthiolate and sodium secondary butylthiolate. The alkali metal lower alkylthiolate can be preformed or formed in situ at the start of the reaction. Preferably, a small amount of excess alkali is present during the reaction. Such alkalis include sodium hydroxide, sodium, potassium hydroxide, sodium carbonate, amines, etc.

As the solvent there can be used n-butyl alcohol, n-amyl alcohol, isooctyl alcohol, 2-ethyl-hexyl alcohol, secondary butyl alcohol.

The 1,2-bis (alkylthio) ethylene is separated from the solvent by steam distillation. A portion of the 1,2-bis (alkylthio) ethylene codistills with the solvent. Recycling of the solvent eliminates the problem of recovering this fraction of the desired product.

The reaction is complete in 3 to 5 hours.

The crude 1,2-bis (alkylthio) ethylene can be oxidized, e.g., with hydrogen peroxide, without further purification to the corresponding 1,2-bis (alkyl sulfonyl) ethylene. The product thus produced can be isomerized from the cis to the trans form with ultra-violet light and bromine.

Examples of sulfonyl compounds which can be prepared include trans-1,2-bis (n-propylsulfonyl) ethylene, trans-1,2-bis (n-butylsulfonyl) ethylene, trans-1,2-bis (n-amylsulfonyl) ethylene, trans-1,2-bis (isopropylsulfonyl) ethylene, trans-1,2-bis (ethylsulfonyl) ethylene, trans-1,2-bis (methylsulfonyl) ethylene and cis-1,2-bis (n-propylsulfonyl) ethylene.

Unless otherwise indicated, all parts and percentages are by weight.

*Example 1*

Into a flask there were placed 2250 cc. of n-amyl alcohol and 528 grams of 50% aqueous sodium hydroxide (6.6 mols, a 10% excess). The solution was stirred and then 456.0 grams of n-propyl mercaptan (6.0 mols) were added dropwise with stirring over a period of 10 minutes. The slurry was heated until all of the water was removed (final temperature 136.0° C.). (The reaction can be carried out without the removal of water but it is preferred to remove the water.)

The slurry was cooled to 10–15° C. and then 296.0 grams of vinylidene chloride (3.0 mols plus 2% excess) was added under the surface over a 30 minute period. The slurry was then refluxed until it reached 138° C. where it was refluxed for two hours. The total time was 4.5 hours. The slurry was cooled to room temperature and then washed with 1250 cc. of water. The organic layer was separated and steam distilled until the distillate became clear. 11% of the cis-1,2-bis (n-propylthio) ethylene codistilled with the amyl alcohol. The weight of the crude cis-1,2-bis (n-propylthio) ethylene after removal of solvent was 485 grams (92% yield).

The solvent recovered by distillation can be recyled to the reaction flask for subsequent runs and thus eliminate the necessity of recovering the product which has codistilled with the solvent. After the first run, no additional product is lost.

*Example 2*

44.0 grams (0.25 mols) of the crude cis-1,2-bis (n-propylthio) ethylene prepared in Example 1 after removal of the solvent, 50 cc. of water, 1.0 ml. of concentrated sulfuric acid and 0.44 grams of molybdenum trioxide were placed in a flask. The heterogeneous mixture was heated to 80° C. and 127.5 grams of 32% aqueous hydrogen peroxide (1.0 mol plus 20% excess) was added with cooling at 80–85° C. over a period of 1.5 to 2 hours. The mixture was maintained at 80–85° C. by heating until at least 110% of the theoretical hydrogen peroxide was consumed. This took about 8.5 hours. The reaction mixture was cooled to 30° C. and then extracted with 100 cc. of chloroform followed by two 50 cc. portions of chloroform. The chloroform extracts were combined and added to 400 cc. of carbon tetrachloride. The resulting solution was irradiated with a sunlamp and several drops of bromine were added. After one-half hour of irradiation, the solution was cooled to 10° C. and filtered. The wet trans-1,2-bis (n-propylsulfonyl) ethylene obtained was vacuum dried to constant weight. The yield was 47.3 grams (73.8%). The over-all yield base on the propyl mercaptan starting material was 72.5%.

We claim:

A process of preparing trans-1,2-bis (n-propylsulfonyl) ethylene comprising reacting sodium n-propylthiolate with vinylidene chloride at atmospheric pressure under alkaline conditions in the presence of n-amyl alcohol at a temperature between 100° C. and the boiling point of the n-amyl alcohol for 3 to 5 hours, removing the n-amyl alcohol from the bulk of the cis-1,2-bis (n-propylthio) ethylene product formed, the crude product is then oxidized with hydrogen peroxide and the oxidized product is dissolved in an organic solvent and then isomerized with ultraviolet light and bromine and there is recovered trans-1,2-bis (n-propylsulfonyl) ethylene.

References Cited in the file of this patent

Truce et al.: J. Am. Chem. Soc. 78, 2748–2751 (1956).